United States Patent
Bajgur et al.

(10) Patent No.: US 6,822,025 B2
(45) Date of Patent: Nov. 23, 2004

(54) FLAME RETARDANT RESIN COMPOSITIONS

(75) Inventors: Chandra S. Bajgur, Bangalore (IN); Sumi, Bangalore (IN); Gaurav Mediratta, Bangalore (IN); Radhakrishna Arakali, Bangalore (IN)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 10/065,888

(22) Filed: Nov. 27, 2002

(65) Prior Publication Data

US 2004/0102549 A1 May 27, 2004

(51) Int. Cl.[7] .......................... C08K 5/523; C08K 5/053
(52) U.S. Cl. ...................... 524/127; 524/140; 524/141; 524/145; 524/386; 524/387; 524/388
(58) Field of Search .......................... 524/127, 140–141, 524/386–388, 145

(56) References Cited

U.S. PATENT DOCUMENTS

| | | | |
|---|---|---|---|
| 3,257,357 A | 6/1966 | Stamatoff | 528/215 |
| 3,257,358 A | 6/1966 | Stamatoff | 528/212 |
| 3,306,874 A | 2/1967 | Hay | 528/275 |
| 3,306,875 A | 2/1967 | Hay | 528/215 |
| 3,914,266 A | 10/1975 | Hay | 556/110 |
| 4,028,341 A | 6/1977 | Hay | 528/215 |
| 4,806,297 A | 2/1989 | Brown et al. | 264/102 |
| 4,806,602 A | 2/1989 | White et al. | 526/397 |
| 4,816,510 A | 3/1989 | Yates, III | 524/449 |
| 4,935,472 A | 6/1990 | Brown et al. | 525/394 |
| 5,089,566 A | 2/1992 | Brown et al. | 525/396 |
| 6,150,443 A * | 11/2000 | Nodera et al. | 524/157 |
| 6,346,574 B1 * | 2/2002 | Nishihara | 525/132 |
| 6,359,043 B1 | 3/2002 | Gijzen | 524/147 |
| 6,423,768 B1 * | 7/2002 | Khouri | 524/445 |
| 6,444,736 B1 | 9/2002 | Touhara et al. | 524/127 |
| 2003/0139504 A1 * | 7/2003 | Miebach et al. | 524/261 |

FOREIGN PATENT DOCUMENTS

GB    2 043 083 A    10/1980

OTHER PUBLICATIONS

Patent Abstracts of Japan, Publication No: 55–082149, Date of Publication of Application: Jun. 6, 1980.

* cited by examiner

Primary Examiner—Peter Szekely

(57) ABSTRACT

A flame retardant thermoplastic resin composition comprises a thermoplastic resin comprising a polyphenylene ether resin, a high impact polystyrene resin or an acrylontrile-butadiene-styrene resin; an organo phosphate compound in an amount less than or equal to about 20 parts by weight for every 100 parts by weight of the thermoplastic resin; and a polyhydric alcohol compound in an amount of about 0.5 to about 5.0 parts for every 100 parts by weight of the thermoplastic resin. A method for the manufacture of the thermoplastic resin composition is also disclosed. The thermoplastic resin composition exhibits high flow characteristics and improved impact strength while providing effective flame retardance.

21 Claims, No Drawings

FLAME RETARDANT RESIN COMPOSITIONS

BACKGROUND

The present disclosure relates to an additive for thermoplastic resins and to resin compositions containing such additives. In particular, the present disclosure relates to additives that enable improved flame retardant characteristics, heat deflection temperatures, and flow rates of thermoplastic resin compositions. The present disclosure also relates to a process for the preparation of a thermoplastic resin composition containing such additives.

Thermoplastic resins are used in different industries for use as materials for manufacturing electric parts and electronic appliances as well as for automobile parts. Additionally, thermoplastic resin compositions also have utility as such as adhesives, sealants, gels, automotives, cabling, electrical applications, aerospace, sporting equipment, electrical laminates, IC encapsulation materials, and the like.

Depending on the intended application, important properties for thermoplastic resin compositions include, but are not limited to, flame retardance, flowability, flexibility, Izod strength, heat distortion temperature, and the like. The standard test for flame retardancy is UL 94. In this test, a flame is applied repeatedly to vertically fastened test specimens. However, in some cases, exposing a polymeric composition to a flame leads to dripping of the flaming polymer material and ignition of the cotton wool mounted below a rod as defined in the test. This undesirable behavior can occur when large amounts of flameproofing agents are used in order to achieve short combustion times.

It is known in the art for example that addition of a halogen flame retardant can be used to impart flame retardancy to thermoplastic resin compositions. However, the use of halogen flame retardants results in the formation of halogen compounds, which can act as impurities in the resin compositions. It is also observed that halogen products are sometimes formed as thermal decomposition products, which can result in corrosion of the kneader, molding machine, mold, and other equipment used in the kneading and molding steps during extrusion. The use of halogen based flame retardants also suffers from the added disadvantage of formation of poisonous gas due to decomposition thereof.

Attempts have been made to avoid the use of halogen based flame retardants by using phosphorous-based compounds. For example, Japanese published application JP-A 55-82149 discloses a method for improving flame retardancy of thermoplastic polyester compositions comprising addition of red phosphorus or a phosphoric acid compound thereto. However, it is observed that the addition of red phosphorous, while avoiding the disadvantages of use of halogen based flame retardants, does not improve the flame retardancy. Moreover, the use of red phosphorus poses several handling problems. Red phosphorous poses the danger of dust explosion and also may emit smell or gas when processed in high temperature. It is also observed that red phosphorus alone does not provide the desired flame retardance and requires large quantities or combinations with other flame retardants.

In the fields where such flame-retardant resin compositions are used as, for example, electric and electronic parts, simplification of assembly and cost reduction have been desired, and it has been promoted to make parts integral or thinner. Therefore, materials used in these parts are required to show satisfactory flowability in molding in addition to maintaining high heat resistance and high flame retardance.

In general, the use of large amounts of flame retardant additive impacts on the heat deflection temperature and flow properties of the resin. Poor melt flow can impact the size and type of the part being prepared from thermoplastic resin and also further affect the equipment in which the composition is being processed.

Addition of organic phosphorus flame retardants to a thermoplastic resin compositions had been employed in an attempt to impart sufficient flame retardance. However, its use in some compositions leads to a considerable reduction in heat resistance. For example, polycarbonate resin compositions containing red phosphorus or stabilized red phosphorus also lack long-term heat stability. Moldings made thereof are often deformed on prolonged exposure to a temperature no higher than around 150° C. Another problem faced in the use of phosphorous based flame retardants is that the compositions obtained thereby can suffer from poor molding processability due to low flowability. While the problem of flow can be overcome by molding at a high temperature, outgassing and decomposition can occur, which may contaminate the mold.

Other problems of using phosphorous compounds additives, e.g., resorcinol bis (diphenylphosphate) (RDP) or Bisphenol A-bis(diphenylphosphate)(BPA-DP), are that the cost overruns can be high. Attempts have been made to reduce the amounts of additives such as RDP or BPA-DP by using it in combination with other additives. For example, U.S. Pat. No. 6,359,043 describes the use of mica in combination with phosphorous additives.

Accordingly, it is desirable to provide a thermoplastic resin formulations, such as polyphenylene ether (PPE) or high impact polystyrene (HIPS), with high flow characteristics with reduced loadings of flow modifier to minimize the impact on heat deflection temperature (HDT)values, impact properties, and flame retardance. Moreover, it is desirable to reduce the amounts of the organic phosphorous compounds in the composition yet still effective to impart suitable flame retardance so as to minimize costs.

BRIEF SUMMARY

Disclosed herein is a flame retardant thermoplastic resin composition. In accordance with one embodiment, the thermoplastic resin composition comprises a thermoplastic resin: an organo phosphate in an amount less than or equal to about 20 parts by weight for every 100 parts by weight of the thermoplastic resin; and a polyhydric alcohol in an amount of about 0.25 to about 5.0 parts per weight for every 100 parts by weight of the thermoplastic resin.

In another embodiment, the thermoplastic resin composition comprises a thermoplastic resin comprising a polyphenylene ether resin, a high impact polystyrene resin or an acrylonitrile-butadiene-styrene resin; a resorcinol bis (diphenyl phosphate) compound in an amount less than or equal to about 20 parts by weight for every 100 parts by weight of the thermoplastic resin; and a polyhydric alcohol compound in an amount of about 0.25 to about 5.0 parts by weight for every 100 parts by weight of the thermoplastic resin.

A method for the manufacture of a flame retardant thermoplastic resin composition extrudate with improved flowability and Izod impact strength comprises mixing a thermoplastic resin comprising a polyphenylene ether resin, a high impact polystyrene resin, or an acrylonitrilebutadiene-styrene resin with an organo phosphate compound and a polyhydric alcohol compound to form a mixture, wherein the organo phosphate compound is in an amount less than or equal to about 20 parts by weight for every 100 parts by weight of the thermoplastic resin, and wherein the polyhydric alcohol is in an amount of about 0.25 to about 5.0 parts by weight for every 100 parts by weight of the thermoplastic resin; and extruding the mixture to form the extrudate.

The above described and other features are exemplified by the following detailed description.

DETAILED DESCRIPTION

The present disclosure relates to novel additive compositions for use as flame retardant aids and/or flow enhancers and/or impact modifiers for thermoplastic resin compositions. Thermoplastic resin compositions within the contemplation of the disclosure include for example, polyphenylene ether resin (PPE) compositions and styrenic polymer compositions such as high impact polystyrene (HIPS) as well as acrylonitrile-butadiene-styrene (ABS) type compositions.

The polyphenylene ether polymers (also referred to herein as "PPE") used in compositions are known polymers comprising a plurality of aryloxy repeating units preferably with at least 50 repeating units of Formula (I):

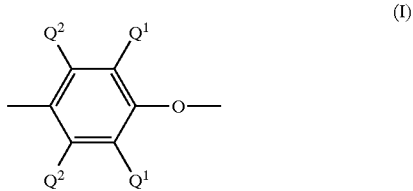

(I)

wherein in each of said units independently, each $Q^1$ is independently hydrogen, halogen, alkyl (preferably primary or secondary lower alkyl containing up to 7 carbon atoms), aryl (preferably phenyl), halohydrocarbon groups (preferably haloalkyl) having at least two carbons between the halogen atoms and the phenyl nucleus of Formula (I), aminoalkyl, hydrocarbonoxy or halohydrocarbonoxy wherein at least two carbon atoms separate the halogen and oxygen atoms and at least two carbon atoms separate the halogen atoms and the phenyl nucleus of Formula (I).

Each $Q^2$ is independently hydrogen, halogen, alkyl (preferably primary or secondary lower alkyl up to 7 carbon atoms), aryl (preferably phenyl), halohydrocarbon (preferably haloalkyl) having at least two carbon atoms between the halogen atoms and the phenyl nucleus of Formula (I), hydrocarbonoxy groups or halohydrocarbonoxy groups wherein at least two carbon atoms separate the halogen and oxygen atoms and at least two carbon atoms separate the halogen atoms from the phenyl nucleus of Formula (I). Each $Q^1$ and $Q^2$ suitably contain up to about 12 carbon atoms and most often, each $Q^1$ is an alkyl or phenyl, especially $C_1$–$C_4$ alkyl and each $Q^2$ is hydrogen.

The term "polyphenylene ether resin," as used in the specification and claims herein, includes unsubstituted polyphenylene ether polymers, substituted polyphenylene ether polymers wherein the aromatic ring is substituted, polyphenylene ether copolymers and blends thereof. Also included are polyphenylene ether polymers containing moieties prepared by grafting onto the polyphenylene ether in a known manner such materials as vinyl monomers or polymers such as polystyrenes and elastomers, as described in U.S. Pat. No. 5,089,566 issued to S. Bruce Brown. Coupled polyphenylene ether polymers in which coupling agents such as low molecular weight polycarbonates, quinones, heterocycles and formals undergo reaction in the known manner with the hydroxy groups of two phenyl ether chains to produce a high molecular weight polymer are also included.

The polyphenylene ether polymers used in the compositions may also have various end groups such as amino alkyl containing end groups and 4-hydroxy biphenyl end groups, typically incorporated during synthesis by the oxidative coupling reaction. The polyphenylene ether polymers may be functionalized or "capped" with end groups, which add further reactivity to the polymer and in some instances provide additional compatibility with other polymer systems that may be used in conjunction with the polyphenylene ether polymers to produce an alloy or blend. For instance, the polyphenylene ether polymer may be functionalized with an epoxy end group, a phosphate end group or ortho ester end group by reacting a functionalizing agent such as 2-chloro-4(2-diethylphosphato epoxy)6-(2,4,6-trimethylphenoxy)-1,3,5-trizene, with one of the end groups of the polyphenylene ether polymer, i.e., one of the terminal hydroxyl groups.

It will be apparent to those skilled in the art from the foregoing that the polyphenylene ether polymers contemplated for use include all of those presently known, irrespective of the variations in structural units.

Suitable polyphenylene ether polymers useful include but are not limited to poly (2,6-dimethyl-1,4-phenylene ether); poly(2,3,6-trimethyl-1,4-phenylene)ether; poly (2,6-diethyl-1,4-phenylene)ether; poly(2-methyl-6-propyl-1,4-phenylene)ether; poly(2,6-dipropyl-1,4-phenylene)ether; poly(2-ethyl-6-propyl-1,4-phenylene)ether; poly(2,6-dilauryl-1,4-phenylene)ether; poly(2,6-diphenyl-1,4-phenylene)ether; poly (2,6-dimethoxy-1,4 phenylene)ether; poly(2,6-diethoxy-1,4-phenylene)ether; poly (2-methoxy-6-ethoxy-1,4-phenylene)ether; poly(2-ethyl-6-stearyloxy-1,4-phenylene)ether; poly(2,6-dichloro-1,4-phenylene)ether; poly(2-methyl-6-phenyl-1,4-phenylene)ether; poly(2-ethoxy-1,4-phenylene)ether; poly(2-chloro-1,4-phenylene) ether; poly(2,6-dibromo-1,4-phenylene)ether; poly(3-bromo-2,6-dimethyl-1,4-phenylene)ether; mixtures thereof, and the like.

Suitable copolymers include random copolymers containing 2,6-dimethyl-1,4-phenylene ether units and 2,3,6-trimethyl-1,4-phenylene ether units.

The polyphenylene ether resins employed in the compositions of this disclosure have an intrinsic viscosity greater than about 0.2 dl/g, as measured in chloroform at 25° C., and generally have a number average molecular weight within the range of about 3,000 to 40,000 and a weight average molecular weight in the range of 20,000 to 80,000, as determined by gel permeation chromatography.

The polyphenylene ether polymers suitable for use in this disclosure may be prepared by any of a number of processes known in the art from corresponding phenols or reactive derivatives thereof. Polyphenylene ether resins are typically prepared by the oxidative coupling of at least one monohydroxy aromatic compound such as 2,6-xylenol or 2,3,6-trimethylphenol. Catalyst systems are generally employed for such coupling and contain at least one heavy metal compound such as copper, manganese, or cobalt compounds, usually in combination with various other materials. Catalyst systems containing a copper compound are usually combinations of cuprous or cupric ions, halide (e.g., chloride, bromide, or iodide) ions and at least one amine such as cuprous chloride-trimethylamine. Catalyst systems, which contain manganese compounds, are generally alkaline systems in which divalent manganese is combined with such anions as halide, alkoxide or phenoxide. Most often, the manganese is present as a complex with one or more complexing and/or chelating agents such as dialkylamines, alkylenediamines, o-hydroxy aromatic aldehydes, o-hydroxyazo compounds and o-hydroxyaryl oximes. Examples of manganese containing catalysts include manganese chloride- and manganese chloride-sodium methylate. Suitable cobalt type catalyst systems contain cobalt salts and an amine.

Examples of catalyst systems and methods for preparing polyphenylether resins are set forth in U.S. Pat. Nos. 3,306,874, 3,306,875, 3,914,266 and 4,028,341 (Hay); U.S. Pat. Nos. 3,257,357 and 3,257,358 (Stamatoff); U.S. Pat. Nos. 4,935,472 and 4,806,297 (S. B. Brown et al.); and U.S. Pat. No. 4,806,602 issued to Dwayne M. White et al.

In general, the molecular weight of the polyphenylene ether resins can be controlled by controlling the reaction time, the reaction temperature, and the amount of catalyst. Longer reaction times will provide a higher average number of repeating units and a higher intrinsic viscosity. At some point, a desired molecular weight (intrinsic viscosity) is obtained and the reaction terminated by conventional means. For example, in the case of reaction systems which make use of a complex metal catalysts, the polymerization reaction may be terminated by adding an acid, e.g., hydrochloric acid, sulfuric acid and the like or a base e.g., potassium hydroxide and the like or the product may be separated from the catalyst by filtration, precipitation or other suitable means as taught by Hay in U.S. Pat. No. 3,306,875.

The PPE preferably comprises a compatibilized or functionalized PPE, wherein compatibility is meant to include the minimization of gross phase separation between the components of the blend (i.e., the PPE and any other ingredients of the blend). Increased tensile elongation, reduced delamination tendency, increased ductility and improved phase morphology stabilization are generally indicators of improved compatibilization. The desirable physical properties of the blend are determined partly by the improvement in the compatibilization between the blend components.

Styrenic polymer compositions of the disclosure are prepared from one or more monoalkenyl aromatic compounds. Representative monoalkenyl aromatic compounds include styrene, alkyl substituted styrenes such as alpha-alkyl-styrenes, and ring substituted styrenes. The term "styrenic polymers" (i.e., polystyrene) as used herein includes polymers prepared by methods known in the art including bulk, suspension and emulsion polymerization, which contain at least 25% by weight of structural units derived from a monomer of the formula (II):

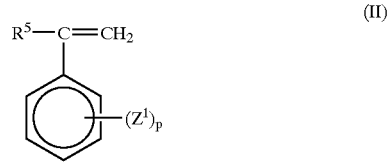

(II)

wherein $R^5$ is hydrogen, lower alkyl or halogen; $Z^1$ is vinyl, halogen or lower alkyl; and p is from 0 to about 5. These resins include homopolymers of styrene, chlorostyrene and vinyltoluene, random copolymers of styrene with one or more monomers illustrated by acrylonitrile, butadiene, alpha-methylstyrene, ethylvinylbenzene, divinylbenzene and maleic anhydride, and rubber-modified polystyrenes comprising blends and grafts, wherein the rubber is a polybutadiene or a rubbery copolymer of about 98–70% styrene and about 2–30% diene monomer.

Polystyrenes are known to be miscible with PPE in all proportions, and any such blend may contain polystyrene in amounts of about 5–95% and most often about 25–75%, based on total resins. Examples of alpha-alkyl-styrenes include alpha-methyl styrene and alpha-ethyl-styrene, while examples of ring substituted styrenes include o-ethyl-styrene, 2,4-dimethyl-styrene and vinyltoluene, such as p-vinyltoluene, vinyl anthracene, and mixtures thereof. The polymer matrix preferably utilizes styrene and/or alpha-methyl styrene as the monoalkenyl aromatic monomer, with styrene being the most preferred monoalkenyl aromatic compound. One or more additional co-monomers such as unsaturated nitrites, for example acrylonitrile, can also be included in the polymerizable monomer mixture. Styrene-containing copolymers such as styrene-acrylonitrile copolymers (SAN), styrene-maleic anhydride copolymers, polyalpha-methylstyrene and copolymers of ethylvinylbenzene, divinylbenzene are also suitable.

Examples of suitable polystyrene resins are generally known in the art and are described for example in Chapter 3 of Organic Polymer Chemistry, $2^{nd}$ edition K. G. Saunders, Chapman and Hall, 1988 and in U.S. Pat. No. 4,816,510, issued to John B. Yates, III.

Acrylonitrile-butadiene-styrene (ABS) graft copolymers contain two or more polymeric parts of different compositions, which are bonded chemically. The graft copolymer is preferably prepared by first polymerizing a conjugated diene, such as butadiene or another conjugated diene, with a monomer copolymerizable therewith, such as styrene, to provide a polymeric backbone. After formation of the polymeric backbone, at least one grafting monomer, and preferably two, are polymerized in the presence of the polymer backbone to obtain the graft copolymer. These resins are prepared by methods well known in the art.

The polymeric backbone is preferably a conjugated diene polymer such as polybutadiene, polyisoprene, or a copolymer, such as butadiene-styrene, butadiene-acrylonitrile, or the like. The conjugated diene monomers normally utilized in preparing the polymeric backbone of the graft copolymer are described by the following formula (III):

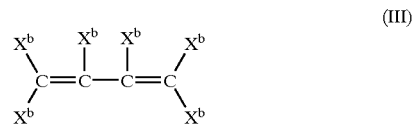

(III)

wherein $X^b$ is hydrogen, $C_1$–$C_5$ alkyl, chlorine, bromine, or the like. Examples of conjugated diene monomers that may be used are butadiene, isoprene, 1,3-heptadiene, methyl-1,3-pentadiene, 2,3-dimethyl-1,3-butadiene, 2-ethyl-1,3-pentadiene; 1,3- and 2,4-hexadienes, chloro and bromo substituted butadienes such as dichlorobutadiene, bromobutadiene, dibromobutadiene, mixtures comprising at least one of the foregoing conjugated diene monomers, and the like. A preferred conjugated diene monomer is butadiene.

One monomer or group of monomers that may be polymerized in the presence of the polymeric backbone are monovinylaromatic hydrocarbons. The monovinylaromatic monomers utilized are described by the following formula (IV):

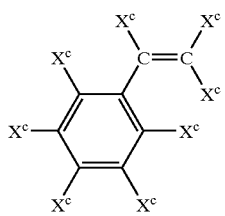

(IV)

wherein $X^c$ is hydrogen, $C_1$–$C_{12}$ alkyl (including cycloalkyl), $C_6$–$C_{12}$ aryl, $C_7$–$C_{12}$ aralkyl, $C_7$–$C_{12}$ alkaryl, $C_1$–$C_{12}$ alkoxy, $C_6$–$C_{12}$ aryloxy, chlorine, bromine, or the like. Examples of the monovinylaromatic monomers include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetra-chlorostyrene, mixtures comprising at least one of the foregoing compounds, and the like. The preferred monovinylaromatic monomers are styrene and/or alpha-methylstyrene.

A second group of monomers that may be polymerized in the presence of the polymeric backbone are acrylic monomers such as acrylonitrile, substituted acrylonitrile and/or acrylic acid esters, exemplified by acrylonitrile, and $C_1$–$C_7$ alkyl acrylates, such as methyl methacrylate, and the like.

The acrylonitrile, substituted acrylonitrile, or acrylic acid esters are described by the following formula (V):

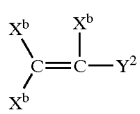

(V)

wherein $X^b$ is as previously defined and $Y^2$ is cyano, $C_1$–$C_{12}$ alkoxycarbonyl, or the like. Examples of such monomers include acrylonitrile, ethacrylonitrile, methacrylonitrile, alpha-chloroacrylonitrile, beta-chloroacrylonitrile, alpha-bromoacrylonitrile, beta-bromoacrylonitrile, methyl acrylate, methyl methacrylate, ethyl acrylate, butyl acrylate, propyl acrylate, isopropyl acrylate, mixtures comprising at least one of the foregoing monomers, and the like. Preferred monomers include acrylonitrile, ethyl acrylate, and methyl methacrylate.

In the preparation of the graft copolymer, the polymeric backbone comprises about 5 to about 60% by weight of the total graft copolymer composition. The monomers polymerized in the presence of the polymeric backbone, exemplified by styrene and acrylonitrile, comprise from about 40 to about 95% by weight of the total graft polymer.

The second group of grafting monomers, exemplified by acrylonitrile, ethyl acrylate or methyl methacrylate, of the graft polymer composition, preferably comprises about 5% to about 40% by weight of the total graft copolymer composition. The monovinylaromatic hydrocarbon exemplified by styrene preferably comprises about 10 to about 70% by weight of the total graft copolymer.

In preparing the graft copolymer, it is normal to have a certain percentage of the polymerizing monomers that are grafted on the polymeric backbone combine with each other and occur as free copolymer. If styrene is utilized as one of the grafting monomers and acrylonitrile as the second grafting monomer, a certain portion of the composition will copolymerize as free styrene-acrylonitrile copolymer. In the case where alpha-methylstyrene (or other monomer) is substituted for the styrene in the composition used in preparing the graft polymer, a certain percentage of the composition may be an alpha-methylstyrene-acrylonitrile copolymer. Also, there are occasions where a copolymer, such as alpha-methylstyrene-acrylonitrile, is added to the graft polymer copolymer blend. Thus, the graft copolymer may, optionally, comprise up to about 80% of free copolymer, based on the total weight of the graft copolymer.

Optionally, the polymeric backbone may be an acrylate rubber, such as the polymerization product of n-butyl acrylate, ethyl acrylate, 2-ethylhexyl acrylate, mixtures comprising at least one of the foregoing, and the like. Additionally, minor amounts of a diene may be copolymerized in the acrylate rubber backbone to yield improved grafting with the matrix polymer.

Acrylonitrile-butadiene-styrene graft copolymers are well known in the art and many are commercially available, including, for example, the high-rubber acrylonitrile-butadiene-styrene resins available from General Electric Company as BLENDEX® grades 131, 336, 338, 360, and 415.

While the thermoplastic resins described above are of wide utility in several applications due to their excellent chemical and mechanical properties, it is often necessary to add flame retardant aids to improve such performance. Styrenic polymers are generally flammable, though PPE resins are relatively good flame retardants in themselves.

The compositions also comprise at least one flame retardant, generally an organic phosphate. The organic phosphate is preferably an aromatic phosphate compound of the formula:

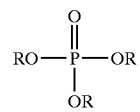

wherein R is the same or different and is an alkyl, cycloalkyl, aryl, alkyl substituted aryl, halogen substituted alkyl, aryl substituted alkyl, halogen, or a combination of any of the foregoing, provided at least one R is aryl.

Examples include phenyl bisdodecyl phosphate, phenyl-bisneopentyl phosphate, phenyl-bis (3,5,5'-tri-methyl-hexyl phosphate), ethyidiphenyl phosphate, 2-ethyl-hexyldi(p-tolyl) phosphate, bis-(2-ethylhexyl)p-tolylphosphate, tritolyl phosphate, bis-(2-ethylhexyl)phenyl phosphate, tri-(nonylphenyl)phosphate, di(dodecyl)p-tolyl phosphate, tricresyl phosphate, triphenyl phosphate, dibutylphenyl phosphate, 2-chloroethyldiphenyl phosphate, p-tolyl bis(2, 5,5'-trimethylhexyl)phosphate, 2-ethylhexyldiphenyl phosphate, and the like. The preferred phosphates are those in which each R is aryl. Especially preferred is triphenyl phosphate, which may be either unsubstituted or substituted, for example, isopropylated triphenyl phosphate.

Alternatively, the organic phosphate can be a di- or polyfunctional compound or polymer having one, or a mixture, of the following formulas:

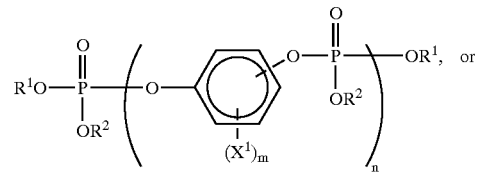

-continued

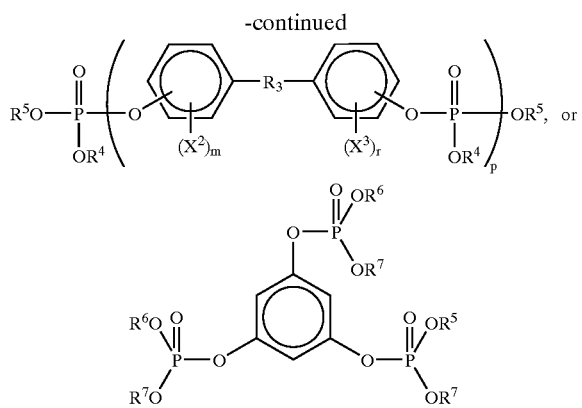

wherein $R^1$, $R^2$, $R^3$, $R^4$, $R^5$, $R^6$, and $R^7$ are independently, a hydrocarbon of C1 to C20, aryl or alkyl substituted aryl; $X^1$, $X^2$, and $X^3$ are halogen: m and r are 0 or integers from 1 to 4, and n and p are from 1 to 30. When m and/or r are 0, the aromatic rings preferably contain hydrogen without halogen substitution.

Examples include the (tetraphenyl)bisphosphates of resorcinol, hydroquinone and bisphenol-A, respectively, or their polymeric counterparts. Methods for the preparation of the aforementioned di- and polyfunctional aromatic phosphates are described in British Patent No. 2,043,083.

Another development is the use of certain cyclic phosphates, for example, diphenyl pentaerythritol diphosphate, as a flame retardant agent for polyphenylene ether resins, as is described by Axeirod in U.S. Pat. No. 4,254,775.

Other suitable flame-retardant additives include compounds containing phosphorus-nitrogen bonds, such as phosphonitrilic chloride, phosphorus ester amides, phosphoric acid amides, phosphonic acid amides, phosphinic acid amides, tris(aziridinyl) phosphine oxide, or tetrakis (hydroxymethyl) phosphonium chloride. These flame-retardant additives are commercially available.

Preferred phosphate flame retardants include those based upon resorcinol such as, for example, resorcinol bis (diphenyl phosphate), as well as those based upon bisphenols such as, for example, bis-phenol A bis(diphenyl phosphate). Phosphates containing substituted phenyl groups are also preferred. In an especially preferred embodiment, the organo phosphate is selected from the group consisting of resorcinol bis(diphenyl phosphate), bis-phenol A bis(diphenyl phosphate), and mixtures containing at least one of the foregoing.

As previously discussed, it is desirable to utilize flame retardant additives in reduced amounts such that all properties such as flowability, heat deflection temperature and flame retardance of the thermoplastic resin are preserved or enhanced.

Organic phosphates, and in particular, RDP or BPA-DP, can be used as a flame retardant aid in various PPE/HIPS formulations to provide effective flame retardance performance. However, the amount of RDP or BPA-DP in the thermoplastic resin composition should preferably be at a minimum both from the point of view of the cost of the additive and also since large amounts of RDP or BPA-DP (greater than or equal to about 16 to 20 parts by weight of RDP or BPA-DP based on the total composition) result in modulus property reduction as well as impair the heat deflection temperature properties of the resin formulation. The present disclosure is based on the surprising recognition of the fact that the synergistic use of select amounts of a polyhydric alcohol such as pentaerythritol with RDP or BPA-DP not only enables reduction in the amount of RDP or BPA-DP in the composition to provide effective flame retardance, but also improved the Izod strength and flowability without deleteriously affecting the heat deflection temperature of the thermoplastic resin composition.

Suitable polyhydric alcohols include acyclic and cyclic compounds having a plurality of hydroxyl groups attached thereto, and include, for example, pentaerythritol, dipentaerythritol, tripentaerythritol, pentitols such as adonitol, arabitol and the like, hexitols such as dulcitol, inositol and the like, and saccharides such as amylose, xylan and the like. The function of the polyhydric alcohol appears to be that of acting as an additional carbonific or carbon source for increasing the amount of char formation. The amount of polyhydric alcohol required appears to be critical for good flame performance; while lower quantities may have no significant impact on flame performance, but higher quantities may even reduce flame performance.

In a preferred embodiment, the thermoplastic composition comprises less than or equal to about 20 parts by weight of the organo phosphate compound, e.g., RDP or BPA-DP, based on the total composition. The polyhydric alcohol, e.g., pentaerythritol is added to the composition in an amount of about 0.25 to about 5.0 parts by weight for every 100 parts of the resin composition, with about 0.5 to about 2.0 parts by weight for every 100 parts of the resin composition more preferred, and with about 1.0 parts by weight for every 100 parts of the resin composition even more preferred. Without wishing to be bound by any theory, it is believed that polyhydric alcohols work in the condensed phase by complementing the RDP or BPA-DP.

The thermoplastic resin composition may also comprise effective amounts of at least one other additive selected from the group consisting of drip retardants, dyes, pigments, additional flow enhancers, impact modifiers, colorants, reinforcing agents, fillers, glass fibers, stabilizers, antistatic agents, plasticizers, lubricants, and the like.

The thermoplastic resin composition of the disclosure is generally prepared by blending the ingredients under conditions appropriate to obtain an intimate blend. The blending can be done using a single or a twin screw type extruder or any mixing device capable of applying a shear to the components. All ingredients may be added initially to the processing system.

The thermoplastic compositions of the disclosure may also be prepared using separate extruders in the processing or using a single extruder with multiple feed ports enabling the addition of multiple components during processing. It is preferable to employ at least one vent port in each section between the feed ports to allow venting (either atmospheric or vacuum) of the melt. Volatile impurities in the blend composition for example, can be removed by applying a vacuum to the melt through a vent port provided in the mixing device. Blending times and temperatures, as well as component addition can be adjusted by those skilled in the art without undue experimentation. Molded articles prepared from the compositions of the present disclosure also represent another embodiment of the disclosure.

The following examples are provided to illustrate some embodiments of the present disclosure. They are not intended to limit the disclosure in any aspect. All percentages are by weight based on the total weight of the entire composition, unless otherwise indicated and all parts are parts by weight.

EXAMPLE 1

A first control resin formulation was prepared by intimately blending a thermoplastic resin with resorcinol bis (diphenylphosphate) (RDP) as an additive in an amount of 1 6 parts of RDP for every 100 parts of the thermoplastic resin. The thermoplastic resin was a polyphenylene ether available under the trade name Noryl 190 X from the General Electric Company.

A portion of the first control resin formulation was taken and extruded in a WP ZSK25 extruder at a feed rate of 33 pounds per hour, at a screw speed of 300 rpm and 53–55 percent torque. The extrudate was then tested for flame retardance, flow, Izod impact, tensile properties and heat deflection temperature. The results obtained are given in Table 1 below.

EXAMPLE 2

A second control resin formulation was prepared by intimately blending Noryl 190 X thermoplastic resin with RDP in an amount of 12 parts of RDP for every 100 parts of thermoplastic resin.

A portion of the second control resin formulation was taken and extruded in a WP ZSK25 extruder at a feed rate of 33 pounds per hour, at a screw speed of 300 rpm and 57 to 59 percent torque. The extrudate was then tested for flame retardance, flow, Izod impact, tensile properties and heat deflection temperature. The results obtained are given in Table 1 below.

EXAMPLE 3

An additive composition was prepared by intimately blending pentaerythritol into a portion of the second control resin formulation (prepared in Example 2) such that the amount of pentaerythritol is 1.5 parts by weight for every 100 parts of the thermoplastic resin.

The resin formulation so obtained was extruded under the same conditions as in Example 1. The extrudate was then tested for flame retardance, flow, Izod impact, tensile properties and heat deflection temperature. The results obtained are given in Table 1 below.

EXAMPLE 4

An additive composition was prepared by intimately blending pentaerythritol into a portion of the second control resin formulation (prepared in Example 2) such that the amount of pentaerythritol is 1.0 parts by weight for every 100 parts of the thermoplastic resin.

The resin formulation so obtained was extruded under the same conditions as in Example 1. The extrudate was then tested for flame retardance, flow, Izod impact, tensile properties and heat deflection temperature. The results obtained are given in Table 1 below.

EXAMPLE 5

An additive composition was prepared by intimately blending pentaerythritol into a portion of the second control resin formulation (prepared in Example 2) such that the amount of pentaerythritol 0.5 parts by weight for every 100 parts of the thermoplastic resin.

The resin formulation so obtained was extruded under the same conditions as in Example 1. The extrudate was then tested for flame retardance, flow, Izod impact, tensile properties and heat deflection temperature. The results obtained are given in Table 1 below. Details of the test procedures follow Table 1.

TABLE 1

| Example | UL 94 Rating | Izod impact (KJ/m$^2$) | Tensile Modulus (Gpa; % elongation) | | Flow Pa · s at 1500/second | Heat deflection temperature (HDT) (° C.) |
| --- | --- | --- | --- | --- | --- | --- |
| 1* | V0 | 13.54 | 2.04 | 17.60 | 151 | 82.0 |
| 2* | V1 | 14.59 | 2.66 | 16.04 | 170 | 83.3 |
| 3 | V0 | 15.29 | 2.37 | 15.40 | 135 | 81.8 |
| 4 | V0 | 19.37 | 2.30 | 16.20 | 133 | 82.2 |
| 5 | V0 | 16.7 | 2.51 | 14.38 | 130 | 82.3 |

*control

Tests for flame retardancy were performed according to UL-94 protocol for a V0 rating using test bars of the thermoplastic resin formulations.

The compositions made in the above examples were tested for flammability using a flame retardant testing tool which provides a prediction of the likelihood that a particular UL standard, such as UL-94 will be passed. The UL-94 protocol calls for bar-shaped specimens of dimensions 5″(12.7 cm)×½″ (1.3 cm) with a 1.6 mm thickness, UL-94 ratings being specified for the particular thickness. A flame having an inner cone of height ¾″ (1.9 cm) is applied to each specimen so that a distance of ⅜″ (1.0 cm) separates the lower end of the specimen from base of the flame. The flame is held in that position for 10 seconds and then removed. A burn time is defined as the time required for the flame issuing from the specimen to disappear. If burning of the specimen ceases within 30 seconds, the flame is reapplied for an additional 10 seconds. The criteria for V-0, V-1, and V-2 ratings are listed below in Table 2.

TABLE 2

| Vertical Flame Class Requirements | | | |
| --- | --- | --- | --- |
| | 94V-0 | 94V-1 | 94V-2 |
| Individual burn time (seconds) | ≦10 | ≦30 | ≦30 |
| Total burn time (seconds) (5 specimens) | ≦50 | ≦250 | ≦250 |
| Glowing time (seconds) (individual specimen) | ≦30 | ≦60 | ≦60 |
| Drip particles that ignite cotton | NO | NO | YES |

For a V-0 rating, no individual burn times, from the first or second application may exceed 10 seconds. The total of the burn times for any five specimens may not exceed 50 seconds. Drip particles that ignite a piece of cotton gauze situated below the specimen are not allowed.

For a V-1 rating, no individual burn times, from the first or second application may exceed 30 seconds. The total of the burn times for any five specimens may not exceed 250 seconds. Drip particles that ignite a piece of cotton gauze situated below the specimen are not allowed.

For a V-2 rating, no individual burn times, from the first or second application may exceed 30 seconds. The total of the burn times for any five specimens may not exceed 250 seconds. Drip particles that ignite a piece of cotton gauze situated below the specimen are allowed.

Heat deflection temperatures were determined by a test procedure based on ASTM D648.

Notched Izod tests were performed by a test procedure based on ISO procedure 180. The results of the test are reported in terms of energy absorbed per unit of specimen area and expressed as kilojoules per meter squared (KJ/m$^2$).

Shear viscosity (i.e., flow) was measured at each shear rate using an Acer 2000 capillary rheometer.

Advantageously, the additive composition of the disclosure results in providing robust flame retardance to the thermoplastic resin formulation. Moreover, the Izod impact as well as flow properties are enhanced by the use of pentaerythritol as a synergist with RDP as a package for thermoplastic resin formulations such as styrenic polymers and PPE resins. Still further, the tensile modulus and percent elongation at break are not impaired. The heat deflection temperature profile of the resin formulation is also not impaired by the use of pentaerythritol as co-additive with RDP. The cost of the formulation is significantly reduced since the use of an inexpensive polyhydrol such as pentaerythritol as the synergist enables the reduction in the total amount of RDP or BPA-DP used and still provide effective flame retardance.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A thermoplastic resin composition comprising
    a polyphenylene ether;
    a polystyrene;
    a flame retardant composition consisting of an organo phosphate in an amount less than or equal to about 20 parts by weight for every 100 parts by weight of the thermoplastic resin, and a polyhydric alcohol in an amount of about 0.25 to about 5.0 parts per weight for every 100 parts by weight of the thermoplastic resin.

2. The thermoplastic resin composition of claim 1, wherein the polyhydric alcohol is a pentaerythritol in an amount of about 0.5 to about 2.0 parts per for every 100 parts by weight of the thermoplastic resin.

3. The thermoplastic resin composition of claim 2, wherein the pentaerythritol is in an amount of about 1.0 parts per weight for every 100 parts by weight of the thermoplastic resin.

4. The thermoplastic resin composition of claim 1, the polystyrene comprises a high impact polystyrene resin.

5. The thermoplastic resin composition of claim 1, further comprising at least one additive selected from the group consisting of drip retardants, dyes, pigments, flow enhancers, impact modifier; colorants, reinforcing agents, fillers, glass fibers, stabilizers, antistatic agents, plasticizers and lubricants.

6. The thermoplastic resin composition of claim 1, wherein the polyhydric alcohol is selected from the group consisting of pentaerythritol, dipentaerythritol, tripentaerythritol, pentitols, hexitols, and saccharides.

7. The thermoplastic resin composition of claim 1, wherein the organo phosphate is selected from the group consisting of resorcinol bis(diphenylphosphate) and bisphenol A-bis(diphenylphosphate).

8. The thermoplastic resin composition of claim 1, wherein the organo phosphate comprises formula:

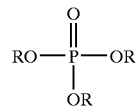

wherein R is the same or different and is an alkyl cycloalkyl, aryl, alkyl substituted aryl halogen substituted alkyl, aryl substituted alkyl, halogen, or a combination of any of the foregoing, provided at least one R is aryl.

9. The thermoplastic resin composition of claim 1, wherein the organo phosphate is a compound of a formula selected from the group consisting of

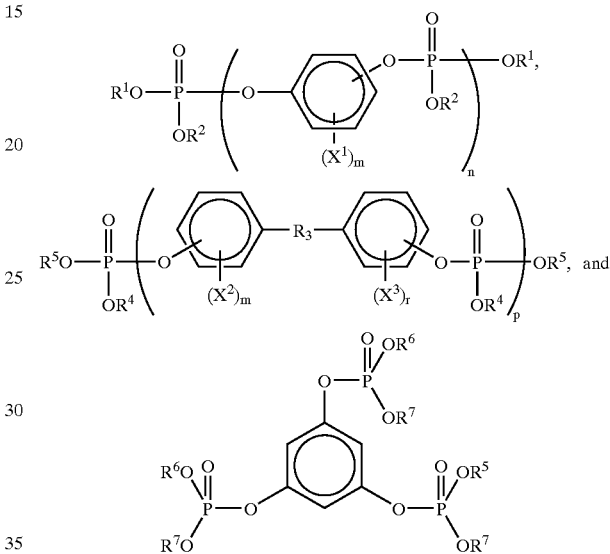

wherein $R^1$, $R^2$, $R^3$, $R^4$, $R^5$, $R^6$, and $R^7$ are independently, a hydrocarbon of C1 to C20, an aryl, an alkyl-substituted aryl; $X^1$, $X^2$, and $X^3$ are halogen; m and r are 0 or integers from 1 to 4, and n and p are from 1 to 30, and wherein when m and/or r are 0, the aromatic rings contain hydrogen without halogen substitution.

10. A thermoplastic resin composition comprising essentially of:
    a polyphenylene ether;
    a polystyrene;
    a flame retardant composition consisting of a resorcinol bis(diphenyl phosphate) compound in an amount less than or equal to about 20 parts by weight for every 100 parts by weight of the thermoplastic resin, and a polyhydric alcohol compound in an amount of about 0.25 to about 5.0 parts by weight for every 100 parts by weight of the thermoplastic resin.

11. The thermoplastic resin composition of claim 10, wherein the polyhydric alcohol is selected from the group consisting of pentaerythritol, dipentaerythritol, tripentaerythritol, pentitols, hexitols, and saccharides.

12. The thermoplastic resin composition of claim 10, wherein the polyhydric alcohol is in an amount of about 0.5 to about 2.0 parts per weight for every 100 parts by weight of the thermoplastic resin.

13. The thermoplastic resin composition of claim 10, wherein the polyhydric alcohol in is an amount of about 1.0 parts per weight for every 100 parts by weight of the thermoplastic resin.

14. A flame retardant article comprising the composition of claim 10, wherein the flame retardant composition has a VO flame rating at a thickness of 1.6 millimeters as measured in accordance with UL-94.

15. A method for the manufacture of a flame retardant thermoplastic resin composition extrudate with improved flowability and Izod impact strength, said method comprising:

mixing a polyphenylene ether resin and a high impact polystyrene resin with a flame retardant composition consisting of an organo phosphate compound and a polyhydric alcohol compound to form a flame retardant mixture, wherein the organo phosphate compound is in an amount less than or equal to about 20 parts by weight for every 100 pars by weight of the thermoplastic resin, and wherein the polyhydric alcohol is in an amount of about 0.25 to about 5.0 parts by weight for every 100 parts by weight of the thermoplastic resin, and wherein the mixture consists essentially of the thermoplastic resin, the organo phosphate compound, and the polyhydric alcohol; and extruding the mixture to form the extrudate.

16. The method of claim 15, wherein the polyhydric alcohol is selected from the group consisting of pentaerythritol, dipentaerythritol, tripentaerythritol, pentitols, hexitols, and saccharides.

17. The method of claim 16, wherein organo phosphate is in an amount of about 1.0 to about 1.5 parts per weight for every 100 parts by weight of the thermoplastic resin.

18. The method of claim 16, wherein the organo phosphates compound is selected from the group consisting of resorcinol bis(diphenylphosphate) and bisphenol A-bis (diphenylphosphate).

19. The method of claim 16, wherein the organo phosphate is a compound of a formula selected from the group consisting of:

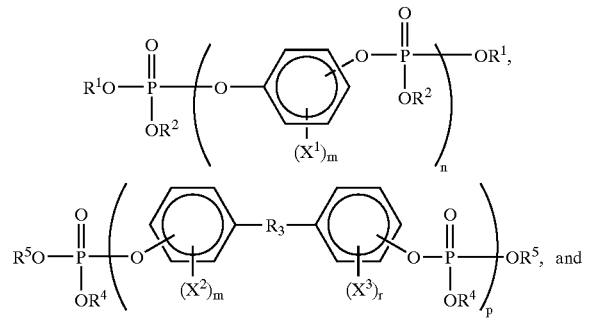

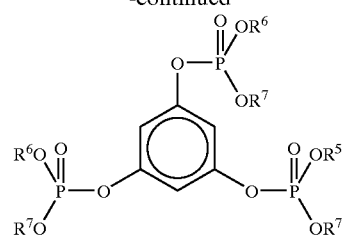

wherein $R^1$, $R^2$, $R^3$, $R^4$, $R^5$, $R^6$, and $R^7$ are independently, a hydrocarbon of C1 to C20, an aryl, an alkyl-substituted aryl; $X^1$, $X^2$, and $X^3$ are halogen; m and r are 0 or integers from 1 to 4, and n and p are from 1 to 30, and wherein when m and/or r are 0, the aromatic rings contain hydrogen without halogen substitution.

20. The method of claim 16, wherein the organo phosphate is of formula:

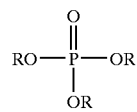

wherein R is the same or different and is an alkyl, cycloalkyl, aryl, alkyl substituted aryl, halogen substituted alkyl, aryl substituted alkyl halogen, or a combination of any of the foregoing, provided at least one R is aryl.

21. A thermoplastic resin composition consisting essentially of:

a polyphenylene ether resin;

a polystyrene resin; and a flame retardant composition consisting essentially of an organo phosphate in an amount less than or equal to about 20 parts by weight for every 100 parts by weight of the thermoplastic resin, and a polyhydric alcohol in an amount of about 0.25 to about 5.0 parts per weight for every 100 parts by weight of the thermoplastic resin.

* * * * *